Dec. 20, 1955  H. R. RUHR  2,727,261
METHODS OF ROUGH ROUNDING SHOE SOLES
Filed May 11, 1953  2 Sheets-Sheet 1

Inventor
Heinrich R. Ruhr
By his Attorney

Dec. 20, 1955    H. R. RUHR    2,727,261
METHODS OF ROUGH ROUNDING SHOE SOLES
Filed May 11, 1953    2 Sheets-Sheet 2

Inventor
Heinrich R. Ruhr
By his Attorney

United States Patent Office 2,727,261
Patented Dec. 20, 1955

2,727,261

METHODS OF ROUGH ROUNDING SHOE SOLES

Heinrich Richard Ruhr, Frankfurt am Main, Germany, assignor, by mesne assignments, to United Shoe Machinery Corporation, Boston, Mass., a corporation of New Jersey Application May 11, 1953, Serial No. 354,252

Claims priority, application Germany July 16, 1952

6 Claims. (Cl. 12—142)

This invention relates to improved methods of rough rounding shoe soles.

As the rough rounding operation is ordinarily carried out, a succession of cuts is made across the sole edge along the desired contour by a rounding knife which cuts with a chopping action against an anvil for supporting the work. The engagement of the knife edge with the anvil, even though the latter is usually provided with a brass insert opposite to the knife, causes progressive dulling and shortening of the knife. Consequently, there is a tendency for the knife not to penetrate the work completely and for the formation of a fringe or fin at the side of the work supported by the anvil.

An object of the present invention is to provide for the performance of the rough rounding operation in such a manner that, without dispensing with the advantages of a chopping knife, the complete severance of the work is effected although the knife is not brought into engagement with the anvil.

With the foregoing in view, the invention in one aspect provides an improved method of rough rounding which consists in first cutting through the greater part of the thickness of the work by a chopping cut which does not fully penetrate the work, and shearing the remaining thickness of the work, which was not penetrated by the chopping cut, to complete the severance of the work.

In practicing the above method, the rounding operation is carried out by making a succession of chopping cuts along the desired outline of the sole edge, these cuts extending nearly but not completely through the sole material and also by making a succession of shearing cuts, each being made upon the sole material not penetrated by the last chopping cut.

The above and other features of the invention will now be described in detail with reference to an illustrative machine shown in the accompanying drawings, and will be defined in the claims, this machine being disclosed and its novel features claimed in my copending divisional application Serial No. 426,731, filed on April 30, 1954.

Figure 1:
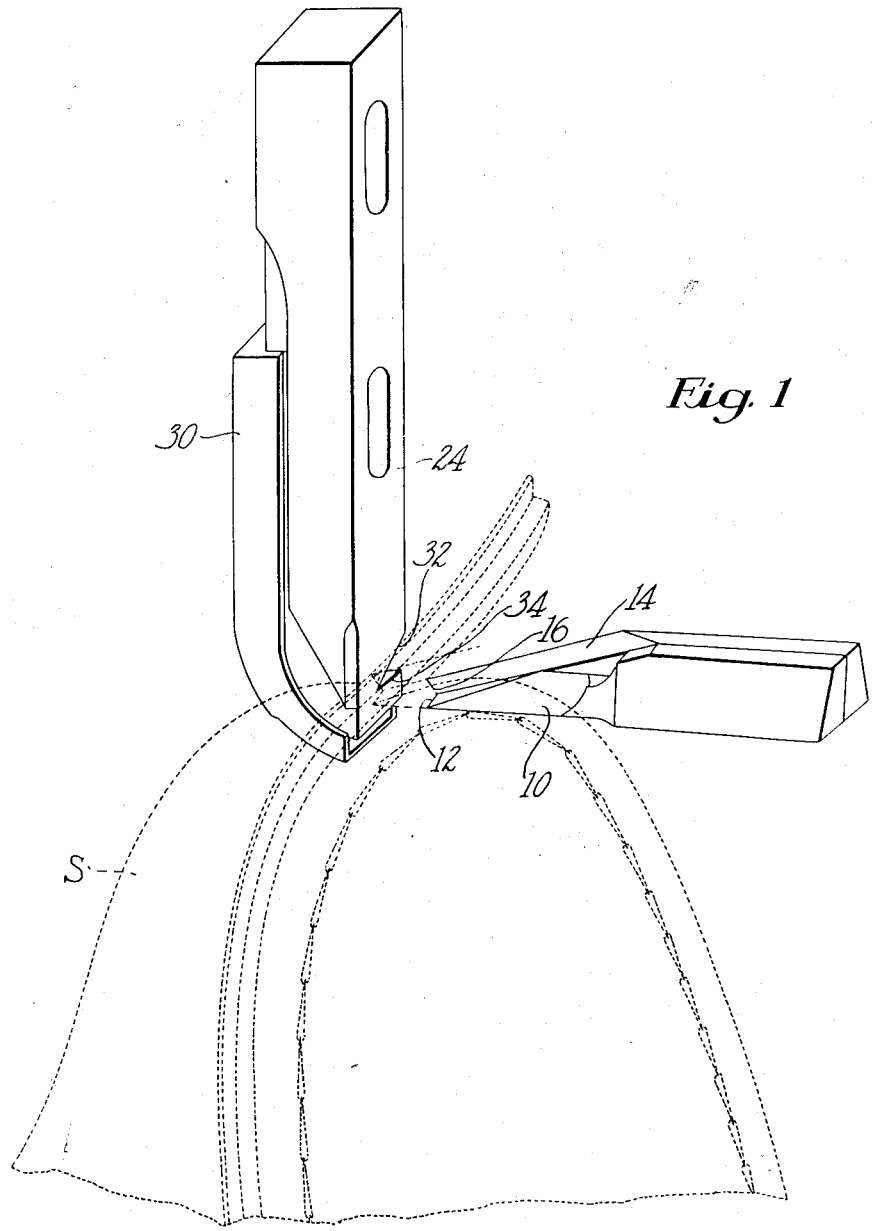
Fig. 1 is a perspective view of only the work engaging instrumentalities of an illustrative machine suitable for practicing the invention, the rounding knife being shown at the beginning and end of its cutting stroke in solid and broken lines, respectively.
Figure 2:
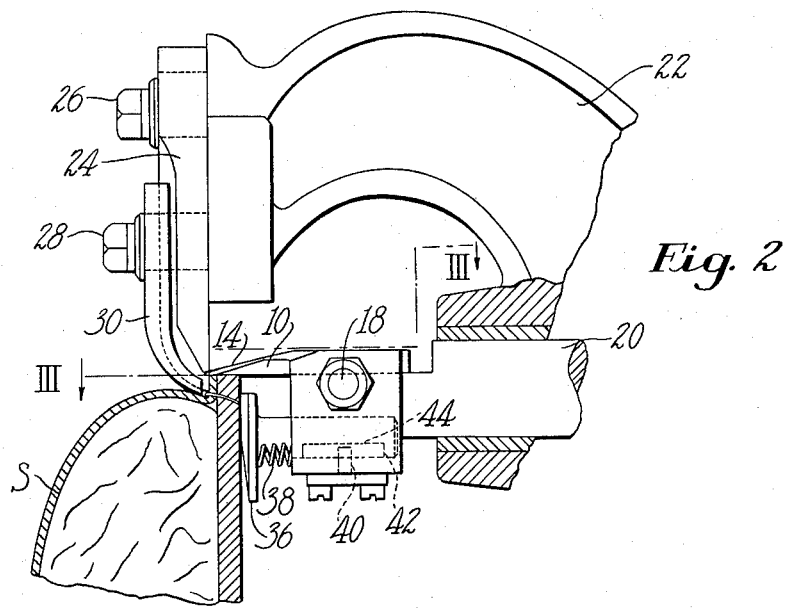
Fig. 2 is a sectional side elevation of the machine with the knife at the end of its cutting stroke.
Figure 3:
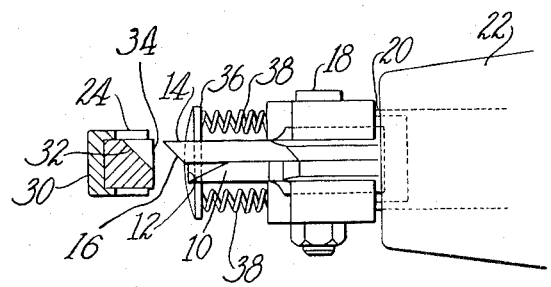
Fig. 3 is a sectional plan view of structure shown in Fig. 2 but with the knife retracted, the section being taken along the line III—III of Fig. 2.

The rounding knife of the illustrative machine comprises a chopping blade 10 having a cutting edge 12 at a right angle thereto and a shearing blade 14 having a skewed cutting edge 16 in the same plane with and disposed at an obtuse angle to the edge 12. The blades, with their cutting edges contiguous to each other, are clamped side by side by a bolt 18 within a dovetail socket at the forward end of a carrier or slide 20 which is mounted to reciprocate in the frame 22. Any suitable driving mechanism for the slide 20 may be employed such, for example, as that disclosed in United States Letters Patent No. 1,474,347, granted November 20, 1923, upon an application filed in the name of R. E. Duplessis.

A shoe S to be rounded is supported against the thrust of the knife by an anvil 24 which is secured to the frame by screws 26, 28, the latter passing through elongated holes in the anvil for permitting it to be adjusted heightwise relatively to the knife. A guide 30, clamped against the forward side of the anvil by the screw 28, is adapted to bear at its lower end against the side of the shoe upper adjacent to the welt crease, and is adjustable vertically to vary the sole edge extension.

When the slide 20 is at the forward end of the cutting stroke the edge 12 of the chopping knife 10 is in proximity to, without touching, a portion of the anvil 24 somewhat above its lower end. Accordingly, the work is not completely penetrated or severed by the chopping knife, but it is supported against the thrust of the knife both inwardly and outwardly thereof from the line of cut. With the knife in this position, the shearing blade 14 is received within a notch 32 formed in the anvil in such a manner that the upper side of the notch is not engaged by this blade. The lower side of the notch is defined by a shoulder and shearing edge 34 which is disposed at the level of and in shearing relation to the cutting edge 16 of the shearing blade 14.

Shortly after the cutting stroke of the knife begins the shoe is held yieldingly against the anvil by a presser 36 which is mounted to slide freely in the slide 20 lengthwise thereof. The presser is urged outwardly of the slide by springs 38, 38 compressed between the presser and the end of the slide, such outward movement being limited by the engagement of a pin 40, fixed to the slide, with an abutment 42 at the rear end of an elongated slot 44 in the presser which receives the pin. This pin and abutment 42 are so arranged that the presser projects slightly in front of the cutting edge 12 before the presser engages the work. For this reason, clamping pressure is applied to the shoe before the cutting action of the chopping knife 10 begins, this clamping pressure being progressively increased as the springs 38, 38 are compressed during the cutting stroke. The presser also holds the shoe against the anvil during the retractive movement of the knife until shortly after the chopping blade is moved out of the kerf, when the presser moves away from the shoe bottom. Thereafter, while the knife is retracted to the end of its return stroke and until it is advanced to bring the presser again into contact with the shoe, the latter is free to be moved through a short feeding movement to present an uncut portion of the sole to the chopping knife 10 and to present to the shearing blade 14 the thin portion of the work which was not penetrated by the previous cutting stroke of the chopping blade.

The stroke of the knife is sufficient, with relation to the thickness of the thickest work for which the machine is designed, to cause the chopping blade 10 always to be moved rearwardly beyond the bottom of the shoe at the end of its retractive stroke, so as not to impede the feeding of the work at this time. However, the shearing blade may or may not have been removed from the kerf, depending upon the thickness of the work. Even if the shearing blade is not drawn out of the kerf it does not prevent a proper feeding movement from being imparted to the work, and does not limit such movement until the end of the kerf last made by the shearing blade is advanced into engagement with its cutting edge 16.

In rounding a shoe in accordance with the present method the shoe is presented to the machine with the side of its upper in engagement with the guide 30, the latter having been adjusted relatively to the knife to obtain the desired sole edge extension. The upper surface of the outwardly flanged marginal portion of a shoe of the stitchdown type, as illustrated herein, or the upper surface of the welt of a welt shoe is supported by the anvil 24, which will have been adjusted to bring its shearing edge and shoulder 34 to the level of, and in shearing relation to, the cutting edge 16 of the shearing blade 14. It is to be understood also that the chopping knife 10 will have been adjusted on the carrier 20 so that at the end of its forward stroke, when the cutting stroke of the chopping blade is completed, its cutting edge 12 will have been moved into proximity to but not into contact with the anvil.

The chopping blade during each cutting stroke passes through the greater part of the combined thickness of the sole and whatever shoe parts are above it such as the outwardly flanged upper or welt, as the case may be, but without penetrating the upper or welt completely. After the chopping blade has been removed from the work during its return stroke the work is fed to the left to bring the portion of the work not penetrated by the previous chopping cut into the field of action of the shearing blade 14, and to advance an uncut portion of the work into the field of action of the chopping blade. During the next cutting stroke of the knife, while the chopping blade is making a new cut in the work, the shearing blade, cooperating with the shoulder 34 on the anvil, makes a shearing cut upon the portion of the work which was not severed by the last chopping cut, this shearing action being advanced toward the right from the end of the previous shearing cut into proximity to the new chopping cut. Thus, by following each incomplete chopping cut with a shearing cut which completes the severance of the work not penetrated by the preceding chopping cut, the marginal portion of the shoe is rounded to the desired contour with assurance that the chip will be completely severed from the work even though the chopping knife is not brought into engagement with the anvil.

The steadiness of the work is furthered during the rounding operation by the pressure 36 which, bearing against the shoe bottom opposite to the anvil, yieldingly holds the upper side of the margin of the shoe against the anvil except for short periods at the beginning of the cutting stroke of the knife and at the end of its return stroke. That is, when the knife and carrier are retracted far enough to remove the presser from the shoe bottom, the work engaging surface of the presser projects slightly in front of the cutting edge 12 of the chopping knife 10. However, soon after the cutting stroke begins the presser engages the shoe bottom and begins to hold the shoe against the anvil before the chopping blade engages or enters the work. Thereafter, during the cutting stroke the presser, under the influence of the springs 38 applies an increasing pressure to the shoe bottom. Although the presser is now stationary in engagement with the shoe bottom, it yields rearwardly within the carrier 20 until the cutting stroke of the knife is terminated. Similarly, during the return stroke of the knife the presser moves forwardly out of the carrier and holds the shoe against the anvil with a progressively diminishing pressure, which always is sufficient to prevent the work from being retracted with the knife, until just after the chopping blade is moved away from the work. At this time, the pin 40 is engaged by the abutment 42 on the presser, whereby any further retractive movement of the knife is also imparted to the presser. Throughout the remaining short portion of the return stroke of the knife the work is no longer clamped against the anvil, and is free to be moved with a feeding movement until the shoe bottom is again engaged by the presser soon after the beginning of the next cutting stroke.

Having thus described my invention, what I claim as new and desire to secure by Letters Patent of the United States is:

1. That improvement in methods of rounding shoes which consists in making a succession of incomplete chopping cuts across the edge of the sole of a shoe along the desired outline and shearing the sole material not penetrated by the chopping cuts whereby the severance of the sole is completed.

2. That improvement in methods of rounding shoes which consists in making a succession of incomplete chopping cuts across the edge of the sole of a shoe along the desired outline, and making a succession of shearing cuts along said outline, each shearing cut being made upon that unsevered portion of the work which the preceding chopping cut failed to penetrate.

3. That improvement in methods of rounding shoes which consists in making a succession of incomplete chopping cuts along the desired contour of the sole edge of a shoe and, simultaneously with each chopping cut, shearing the unsevered portion of the sole which the preceding chopping cut failed to penetrate.

4. That improvement in methods of rounding shoes which consists in making a succession of incomplete chopping cuts across the edge of the sole of a shoe along the desired outline, and making a shearing cut progressively upon the partially severed portion of the work up to the last chopping cut.

5. That improvement in methods of rounding shoe soles which consists in making incomplete chopping cuts across the edge of a sole along the desired outline thereof, imparting intermittent feeding movements to the shoe between successive chopping cuts, and completing the severance of the work by making a shearing cut for each chopping cut through the material which the last chopping cut failed to penetrate.

6. That improvement in methods of rounding shoe soles which consists in making a succession of incomplete chopping cuts across the edge of a sole along the desired outline thereof, intermittently feeding the work between successive chopping cuts, and simultaneously with each chopping cut shearing toward the last chopping cut the portion of the sole which the last chopping cut failed to penetrate.

References Cited in the file of this patent

UNITED STATES PATENTS

| | | |
|---|---|---|
| 1,474,347 | Duplessis | Nov. 20, 1923 |
| 2,075,923 | Bagshaw | Apr. 6, 1937 |
| 2,607,059 | Baker | Aug. 19, 1952 |
| 2,639,449 | Baker | May 26, 1953 |